US012693950B1

(12) United States Patent　　　　　(10) Patent No.:　US 12,693,950 B1

Halstead et al.　　　　　　　　　　　　(45) Date of Patent:　　　Jul. 28, 2026

(54) CACHE USAGE OPTIMIZATION FOR REMOTE DATA REPLICATION

(71) Applicant: Dell Products L.P., Round Rock, TX (US)

(72) Inventors: Mark Halstead, Holliston, MA (US); Ramesh Doddaiah, Westborough, MA (US); Mohammed Asher, Bangalore (IN); Sandeep Chandrashekhara, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/037,355

(22) Filed: Jan. 27, 2025

(51) Int. Cl.
　　　*G06F 11/20*　　　　　(2006.01)
(52) U.S. Cl.
　　　CPC ................................. *G06F 11/2082* (2013.01)
(58) Field of Classification Search
　　　CPC .......................... G06F 11/2082; G06F 11/2056
　　　USPC ................................................ 714/6.21, 6.23
　　　See application file for complete search history.

(56) References Cited

U.S. PATENT DOCUMENTS

| 2011/0154102 A1* | 6/2011 | Akutsu ............... | G06F 11/2082 |
| | | | 714/6.1 |
| 2022/0100379 A1* | 3/2022 | O'Halloran ............. | G06F 3/065 |
| 2022/0229605 A1* | 7/2022 | Degwekar ............. | G06F 3/0604 |

OTHER PUBLICATIONS

Maruthachalam et al., "A distributed system design for next generation storage and remote replication," The Fifth International Conference on the Applications of Digital Information and Web Technologies (ICADIWT 2014), Bangalore, India, 2014, pp. 22-27, doi: 10.1109/IC (Year: 2014).*

Dell Technologies Inc., "Dell EMC SRDF Introduction", Rev. 01, Sep. 2019 (Year: 2019).*

* cited by examiner

*Primary Examiner* — Chae M Ko

(74) *Attorney, Agent, or Firm* — Krishnendu Gupta; Nikhil Patel

(57)　　　　　　　　ABSTRACT

One or more aspects of the present disclosure relate to optimizing cache utilization in storage arrays with remote replication. When a write operation is received at a local array, write data is stored in an unmirrored cache slot rather than traditional mirrored slots. The system initiates parallel operations: a synchronous cut-through write to temporary disk space in the local array and a remote write to mirrored cache slots in a remote array. The cut-through write bypasses the backend adapter to write directly to disk, completing in microseconds compared to milliseconds for remote writes. After receiving acknowledgments from both operations, a write completion is sent to the host. The system maintains fault tolerance through multiple redundancy mechanisms while reducing DRAM usage from four copies to three across the primary and secondary arrays.

20 Claims, 6 Drawing Sheets

500 receiving a write input/output (IO) operation at a local array storing write data corresponding to the write IO operation in an unmirrored cache slot in the local array initiating, in parallel: a synchronous cut-through write of the write data to a temporary disk space in the local array, and a remote write of the write data to one or more mirrored cache slots in a remote array receiving acknowledgments of completion of the synchronous cut-through write and the remote write sending a write completion acknowledgment to a host associated with the write IO operations after receiving the acknowledgments of completion of the synchronous cut-through write and the remote write

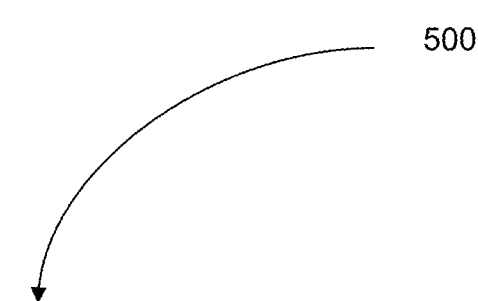

500 receiving a write input/output (IO) operation at a local array

502 storing write data corresponding to the write IO operation in an unmirrored cache slot in the local array

504 initiating, in parallel: a synchronous cut-through write of the write data to a temporary disk space in the local array, and a remote write of the write data to one or more mirrored cache slots in a remote array

506 receiving acknowledgments of completion of the synchronous cut-through write and the remote write

508 sending a write completion acknowledgment to a host associated with the write IO operations after receiving the acknowledgments of completion of the synchronous cut-through write and the remote write

CACHE USAGE OPTIMIZATION FOR REMOTE DATA REPLICATION

BACKGROUND

Storage arrays implement multiple layers of redundancy across their components to ensure data protection and high availability. In conventional systems, data redundancy is achieved through mirrored cache slots in dynamic random-access memory (DRAM) and RAID-protected disk storage. For remote replication configurations, storage arrays maintain synchronized copies of data between primary and secondary sites, with each array utilizing its cache memory and disk subsystems to process and store incoming write operations. The arrays communicate through dedicated replication networks, maintaining consistent data copies while handling local input/output (IO) operations and remote replication tasks.

SUMMARY

One or more aspects of the present disclosure relate to optimizing cache utilization in a storage system with a local and remote array. In embodiments, a write input/output (IO) operation is received at a local array. Additionally, write data corresponding to the write IO operation is stored in an unmirrored cache slot in the local array. In parallel, a synchronous cut-through write of the write data to a temporary disk space in the local array and a remote write of the write data to one or more mirrored cache slots in a remote array is initiated. Acknowledgments of completion of the synchronous cut-through and remote write are also received. Further, a write completion acknowledgment to a host associated with the write IO operations is sent after receiving the acknowledgments of completion of the synchronous cut-through write and the remote write.

In embodiments, whether the write IO operation targets a device enabled for synchronous remote replication can be determined. Additionally, the unmirrored cache slot can be selected based on the determination.

In embodiments, the write data from the unmirrored cache slot can be asynchronously destaged to a disk drive in the local array according to data reduction and RAID protection rules.

In embodiments, the write data can be retrieved from the temporary disk space in response to a failure of the unmirrored cache slot in the local array.

In embodiments, access to the write data can be maintained through the unmirrored cache slot and the temporary disk space in the local array in response to a failure of the remote array and a network connecting the local and remote arrays.

In embodiments, the write data can be retrieved from the one or more mirrored cache slots in the remote array in response to failures of the unmirrored cache slot and the temporary disk space in the local array.

In embodiments, the synchronous cut-through write can be executed by bypassing a backend adapter to write directly to the temporary disk space.

In embodiments, a write pending status for the unmirrored cache slot can be cleared after completing an asynchronous destaging. Further, the unmirrored cache slot can be freed for reuse.

In embodiments, memory usage in the local array can be reduced by storing the write data in the unmirrored cache slot instead of a mirrored cache slot while maintaining fault tolerance through the temporary disk space and remote array copies.

In embodiments, the synchronous cut-through write can be completed in less time than the remote write to avoid adding latency to the write IO operation.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

FIG. 5 is a flow diagram of a method for optimizing cache utilization in a storage system with a local and remote array per embodiments of the present disclosure.

DETAILED DESCRIPTION

Figure 1:
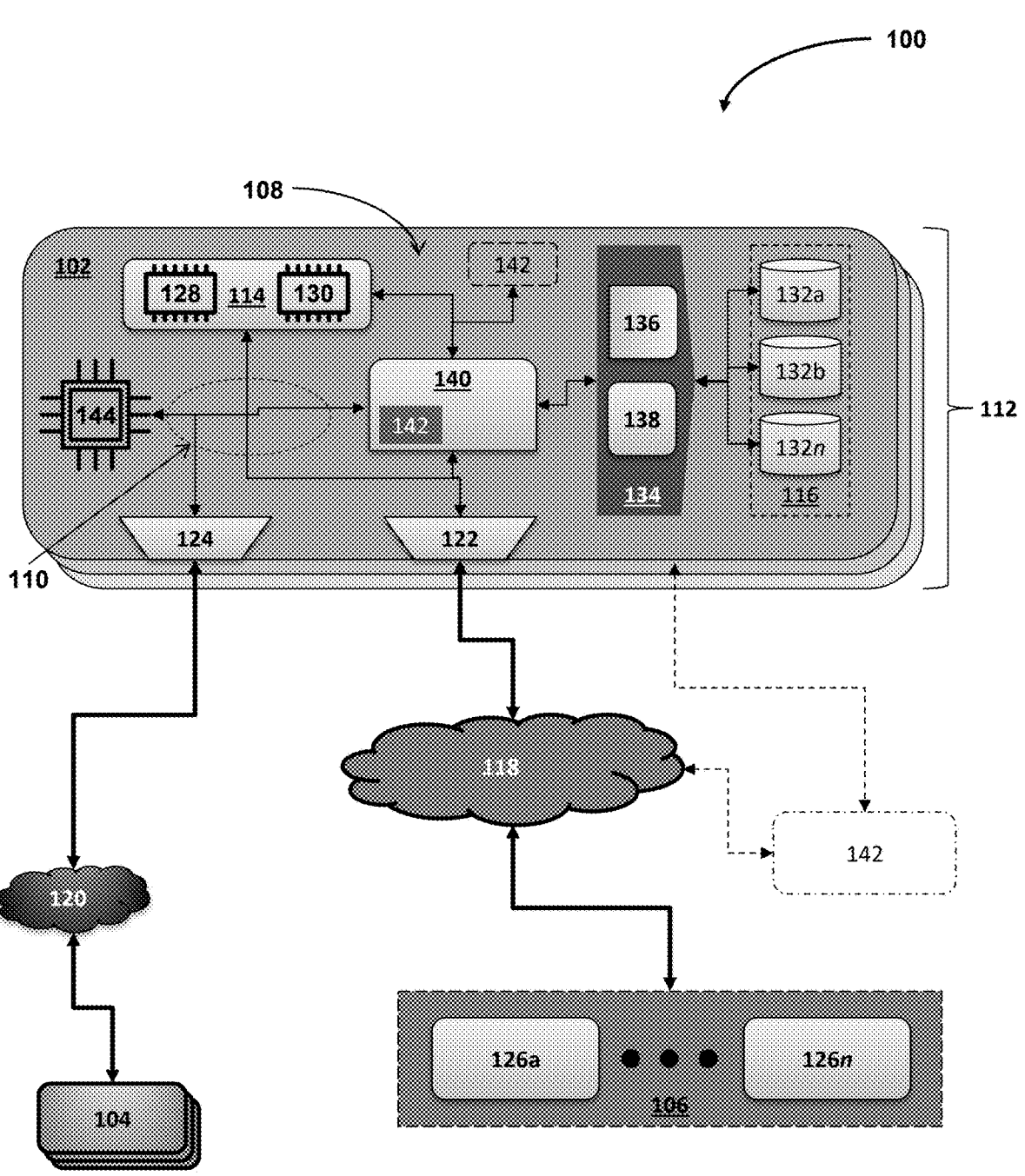
FIG. 1 illustrates a distributed network environment in accordance with embodiments of the present disclosure.

In modern enterprise storage environments, financial institutions like major banks rely heavily on storage arrays with remote replication capabilities to ensure continuous access to critical transaction data and maintain regulatory compliance. These storage systems traditionally implement multiple layers of redundancy across system components, including CPU, cache, disk, and remote replication facilities, to prevent data loss and maintain high availability.

Consider a bank's primary data center that maintains customer account records and transaction data. The storage array at this location typically maintains two copies of all write data in its local cache memory, while a secondary data center maintains two additional copies, resulting in four total DRAM copies of the same data. While providing robust data protection, this approach leads to significant costs due to expensive DRAM usage and reduces the number of available cache slots, potentially impacting transaction processing performance.

To address these challenges, embodiments of the present disclosure optimize cache utilization while maintaining fault tolerance by leveraging unmirrored cache slots for synchronous remote replication operations. When a write operation targets a device enabled for synchronous remote replication, such as a critical database volume, the embodiments store the write data in an unmirrored cache slot in the local array rather than a mirrored slot.

The embodiments initiate two parallel operations: a synchronous cut-through write to temporary disk space in the local array that bypasses the backend adapter and a remote write to mirrored cache slots in the remote array. For example, when a bank customer initiates a transaction, the write data is stored in an unmirrored slot at the primary site while simultaneously being written to both the local temporary disk and the remote site's mirrored cache.

This approach maintains comprehensive fault tolerance through multiple redundancy mechanisms. If the unmirrored cache slot fails at the primary site, data can be recovered from the temporary disk space. If the remote site or network connection fails after host acknowledgment, the data remains available through the local unmirrored slot and disk copy. In case of dual failures affecting the local cache and disk, data can be retrieved from the remote site's mirrored copies.

The embodiments wait for acknowledgments from the local disk write and remote write operations before confirming transaction completion. Since the local disk write typically completes in microseconds while the remote write takes milliseconds, this approach does not add latency compared to conventional implementations. After receiving acknowledgments, the embodiments asynchronously destage the write data from the unmirrored cache slot to permanent storage according to typical data reduction and RAID protection rules.

By reducing DRAM usage by eliminating one mirror copy in the local array while preserving fault tolerance through the temporary disk copy, embodiments of the present disclosure enable more efficient utilization of expensive memory resources. This approach lowers infrastructure costs for financial institutions while maintaining or improving performance through increased cache slot availability. The solution also reduces CPU overhead by minimizing cache slot recycling operations, allowing more efficient processing of high-volume financial transactions.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
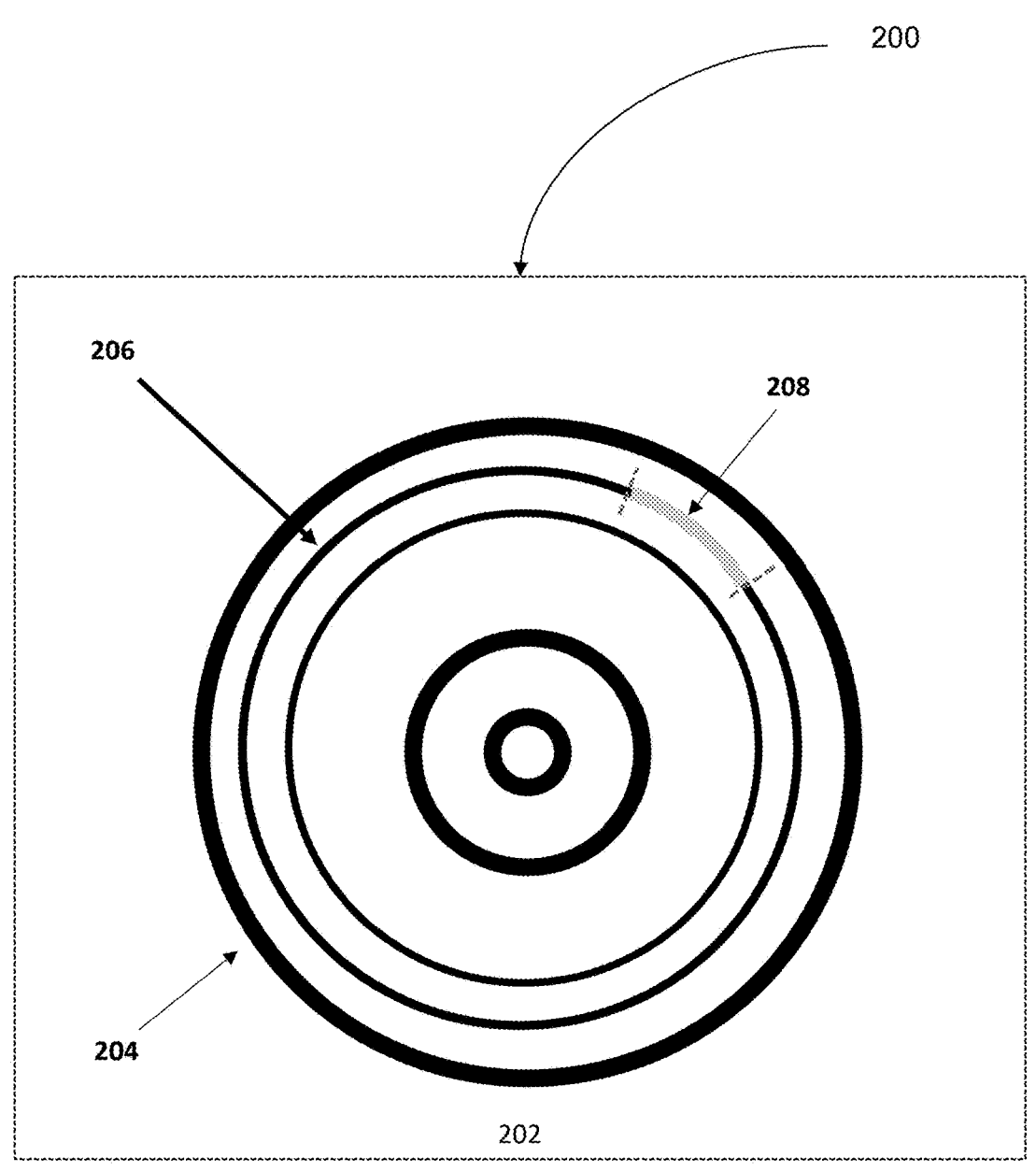
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-n. For example, the EDS 140 can provide a host, e.g., client machine 126a, with a virtual storage device (e.g., thin-device (TDEV)) that logically represents zero or more portions of each storage device 132a-n. For example, the EDS 140 can establish a logical track using zero or more physical address spaces from each storage device 132a-n. Specifically, the EDS 140 can establish a continuous set of logical block addresses (LBA) using physical address spaces from the storage devices 132a-n. Thus, each (LBA) represents a corresponding physical address space from one of the storage devices 132a-n. For example, a track can include 256 LBAs, amounting to 128 kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
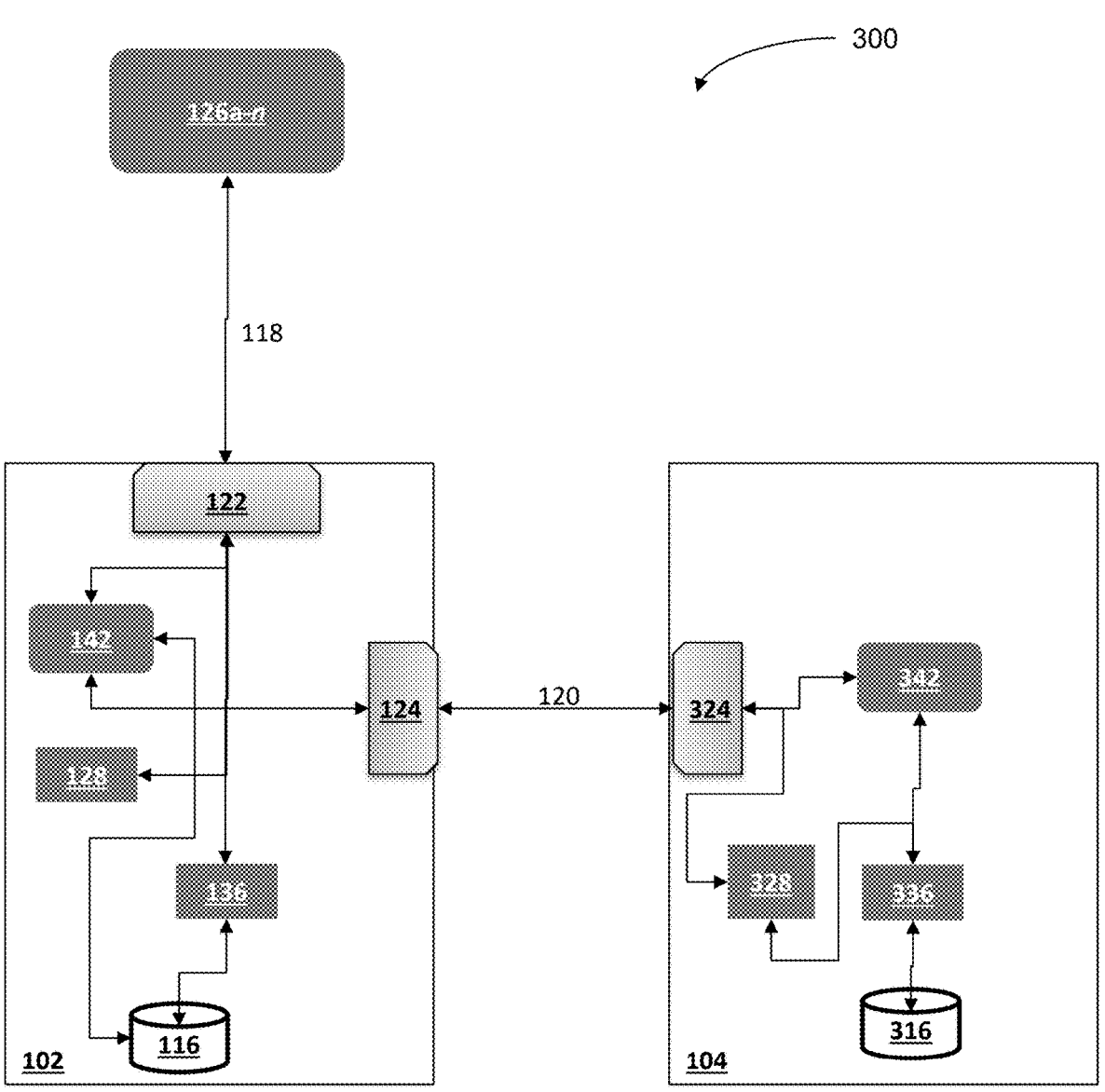
FIG. 3 is a block diagram of a storage network with a local and remote storage array in accordance with embodiments of the present disclosure.

Regarding FIG. 3, a host adapter 122 of a storage array 102 can receive input/output (IO) workloads from one or more hosts 126a-n via a network 118. In embodiments, the storage array 102 can include a controller 142 that implements an optimized approach for handling write operations from the IO workloads in storage systems with synchronous remote replication, focusing on reducing memory (e.g., DRAM cache) utilization while maintaining fault tolerance. Accordingly, the controller 142 can determine whether an incoming write IO operation corresponding to the IO workload targets a storage device corresponding to the persistent storage 116 enabled for remote replication. The controller 142 can consult configuration information stored in, e.g., global memory 128 to make the determination. For example, the configuration information can associate storage devices using unique identifiers with a remote replication indication.

For remote replication-enabled devices, the controller 142 stores incoming write data in an unmirrored cache slot of global memory 128 rather than traditional mirrored cache slots, representing a significant departure from conventional systems where all write data is automatically mirrored in cache for redundancy. This optimization reduces DRAM cache requirements by approximately 50% compared to traditional approaches that maintain four copies across primary and secondary arrays.

Further, the controller 142 can initiate two parallel execution paths to maintain data protection: a synchronous cut-through write operation (Backend as a Service-BEaaS) to a temporary disk space corresponding to the persistent storage 116 on the local array 102, and a remote write operation to the remote array 120 via a remote network 120. The BEaaS write bypasses the traditional backend adapter path (e.g., via a disk adapter 136), enabling direct writes to disk that complete in approximately 100 microseconds for small block writes and 100-200 microseconds for large block writes. Simultaneously, the controller 142 transmits the write data through a local remote adapter 124 to the remote array 104 via its corresponding remote adapter 324, where it is stored in mirrored cache slots of a remote global memory 328, typically taking more than 200 microseconds.

When the remote array (R2) 104 receives a write command and data from the local array (R1) 102 through the replication network 120, it processes the data differently than the local array. The remote array 104 maintains two mirrored copies of the data-a primary copy and a secondary copy in mirrored cache slots of the remote array's global memory 328.

The remote array's controller 342 stores these copies in mirrored cache slots to maintain redundancy, unlike the local array 102, which uses an unmirrored slot. After storing the data in the mirrored cache slots, the remote array 104 sends an acknowledgment back to the local array 102 through the remote adapter 324.

Once the mirrored copies are established in a cache of the remote array's global memory 328, the remote array 104 asynchronously destages the data to its disk drive 316 through its backend adapter 336, following standard data reduction and RAID protection rules. This asynchronous destaging occurs independently of the acknowledgment sent to the local array 102.

The remote array 104 maintains this mirrored caching approach to ensure data availability even if one of its memory boards fails. This is particularly important since the remote array 104 serves as a recovery source if both the local array's memory board 128 and disk drive 116 fail simultaneously.

The remote write operation typically takes longer than 200 microseconds to complete, even at zero distance, significantly longer than the local array's BEaaS write operation. However, this longer processing time does not impact overall system latency since the local array can acknowledge the host write once both the BEaaS write and remote write are complete.

To ensure data integrity and consistency, the controller 142 implements sophisticated timing controls and acknowledgment handling. It waits for acknowledgments from both the BEaaS write and remote write operations before confirming completion to the hosts 126*a-n*. Since the BEaaS write typically completes before the remote write, this parallel execution strategy ensures the optimization doesn't introduce additional latency to write operations.

The controller 142 also maintains comprehensive fault tolerance through several recovery mechanisms. If the unmirrored cache slot of the global memory 128 fails, data can be recovered from the temporary disk space where the synchronous cut-through write stored a copy. In case of a remote array or network failure after host acknowledgment, data availability is maintained through the local unmirrored cache slot and the disk copy. Even with simultaneous failure of the local array's memory board and disk drive, the controller 142 can recover data from the mirrored copies in the global memory 328 of the remote array 104.

After the synchronous operations are complete, the controller 142 manages asynchronous destaging of data from the unmirrored cache slot to permanent storage, following standard data reduction and RAID protection rules. Once destaging completes, the controller 142 clears the write pending status and frees the unmirrored cache slot for reuse, enabling efficient cache slot recycling.

The architecture 300 enables several key performance optimizations. The reduced cache usage leads to improved cache hit rates and better overall system performance. The controller 142 requires less cache recycling, reducing CPU overhead and conserving processing cycles. The parallel execution of local disk writes and remote replication ensures no additional latency is introduced, as the BEaaS write typically completes before the remote write.

For non-replicated devices, the controller 142 maintains traditional mirrored cache slots to ensure appropriate redundancy. This selective application of the unmirrored cache slot strategy allows the system to optimize DRAM usage while maintaining necessary protection levels for different types of storage devices.

The controller 142 implements sophisticated error handling and recovery procedures. It maintains multiple data copies strategically distributed across different storage mediums and locations, with defined recovery procedures for various failure scenarios. The architecture 300 preserves robust fault tolerance through direct disk writes, parallel operation execution, and efficient cache slot utilization, while significantly reducing the DRAM requirements and associated costs This optimized approach delivers significant benefits: reduced DRAM cache requirements, improved cache utilization, maintained fault tolerance, and lower system costs. The controller 142 achieves these improvements while ensuring no impact on write operation latency and maintaining the robust fault tolerance required in enterprise storage environments.

The controller 142 also implements sophisticated performance monitoring and optimization capabilities. It tracks the timing of BEaaS and remote write operations to ensure optimal performance, with BEaaS writes consistently completing in microseconds while remote writes take milliseconds. This timing differential allows the controller 142 to efficiently manage acknowledgments and maintain performance without introducing additional latency.

For write operations targeting non-replicated devices, the controller 142 maintains separate handling logic to ensure appropriate redundancy through traditional mirrored cache slots. This selective application of caching strategies enables the controller to optimize DRAM usage based on device configuration while maintaining necessary protection levels.

The controller 142 implements comprehensive cache management capabilities, including tracking write pending status, managing slot allocation and deallocation, and coordinating cache slot recycling. These capabilities are particularly important for maintaining optimal performance as the reduced cache usage leads to more efficient slot utilization and fewer recycling operations.

Regarding data integrity, the controller 142 ensures proper destaging of data from the cache of the global memory 128 to permanent storage 116 through multiple mechanisms. It coordinates the asynchronous destaging process using standard data reduction and RAID protection rules. The controller also manages the transition from temporary disk storage to permanent RAID-protected storage while maintaining data availability.

The controller's architecture enables significant operational benefits through its parallel processing capabilities. By executing local disk writes and remote replication simultaneously, it maximizes throughput while minimizing latency. The controller's ability to bypass traditional backend adapter paths for BEaaS operations further enhances performance by reducing processing overhead.

For recovery scenarios, the controller 142 maintains comprehensive state information to enable rapid fault detection and recovery. It tracks the status of local and remote copies, manages recovery procedures for various failure scenarios, and coordinates data reconstruction when necessary. This robust fault management capability ensures the system can maintain data availability even during multiple simultaneous failures.

Figure 4:
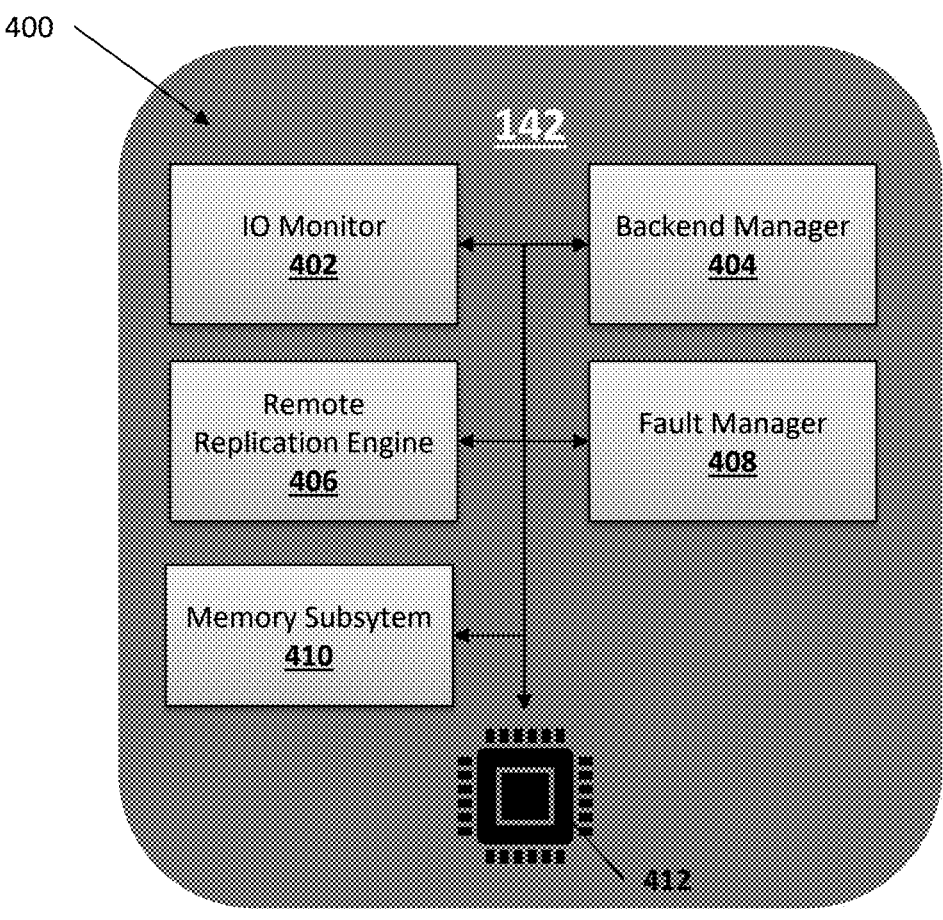
FIG. 4 is a block diagram of a controller in accordance with embodiments of the present disclosure.

Regarding FIG. 4, a storage array (e.g., the storage array 102 of FIG. 1) can include a controller 142 that includes hardware, circuitry, and logic 400 configured to optimize memory (e.g., DRAM) utilization by using unmirrored cache slots and synchronous cut-through writes for devices with remote replication, while maintaining fault tolerance through parallel writes to temporary disk space and remote mirrored slots. This approach reduces cache usage and improves performance without compromising data protection or adding latency.

In embodiments, the controller can include an IO monitor 402 initial processing and routing of write IO operations received by the storage array. Upon receiving a write IO operation from a host, the IO monitor 402 examines device configuration information stored in a local memory 412 to determine if the target device is enabled for synchronous remote replication.

For replication-enabled devices, the IO monitor 402 allocates an unmirrored cache slot in the local array's DRAM, departing from traditional mirrored cache implementations. It then stores the incoming write data in this unmirrored slot, which serves as the primary copy. This optimization effectively doubles the available cache space compared to conventional mirrored approaches.

The IO monitor 404 coordinates parallel operations by simultaneously initiating both a synchronous cut-through write to temporary disk space and a remote write operation. It monitors acknowledgments from a backend manager 404 (for local disk writes) and a remote replication engine 406 (for remote array writes). After receiving both acknowledgments, the IO monitor 402 sends a write completion acknowledgment back to the host.

For non-replication devices, the IO monitor 402 maintains traditional mirrored cache slot behavior to preserve conventional redundancy mechanisms. This selective approach allows the IO monitor 402 to optimize DRAM usage only where appropriate while maintaining required fault tolerance levels.

In embodiments, the controller 142 can also include a backend manager 404 that handles disk operations for the storage array. For example, the backend manager 402 executes Backend-as-a-Service (BEaaS) operations that bypass the traditional backend adapter to write directly to temporary disk space.

For small block writes up to 8 KB, the backend manager 404 completes operations in approximately 100 microseconds, while large block writes above 128 KB complete in 100-200 microseconds. This performance optimization is critical as it ensures the local disk write consistently completes before remote replication, which typically takes over 200 microseconds even at zero distance.

The backend manager 404 coordinates two key write paths: synchronous cut-through writes to temporary disk space and asynchronous destaging to permanent storage. For synchronous operations, it bypasses the backend adapter to write directly to disk, enabling significantly faster completion times than traditional approaches. For asynchronous destaging, it manages the transfer of data from unmirrored cache slots to permanent storage following normal data reduction and RAID protection rules.

The backend manager 404 also implements sophisticated failure-handling mechanisms. In the event of a primary cache failure, the backend manager 404 can retrieve data from the temporary disk space where the synchronous cut-through write was performed. It maintains access through the local disk copy if the remote array fails, and coordinates with the remote array for data recovery in cases of dual local failures affecting both cache and disk.

Through these optimizations, the backend manager 404 enables improved IOPS (IOs per second) and reduced latency while maintaining fault tolerance. Its efficient handling of disk operations contributes to reduced system costs by allowing for smaller cache configurations while preserving enterprise-grade data protection.

In embodiments, the controller 142 can include a remote replication engine 406 that manages synchronous replication operations between the local array (e.g., the storage array 102 of FIG. 1) and a remote storage array (e.g., the remote array 104 of FIG. 1). Upon receiving write data from the IO monitor 402, the engine 406 initiates remote write operations to create mirrored cache copies in the remote array.

For replication-enabled devices, the engine 406 coordinates with the remote array to maintain two mirrored copies in the remote array's cache while the local array uses an unmirrored slot. This optimization reduces DRAM usage on the primary side while preserving redundancy through the remote copies The engine 406 implements sophisticated timing controls to ensure optimal performance. Remote write operations typically complete in over 200 microseconds, which allows the backend manager's faster disk writes (100-200 microseconds) to complete first. This timing relationship prevents the replication process from introducing additional latency.

For fault tolerance, the remote replication engine 406 maintains multiple recovery paths. If the primary cache fails, data can be retrieved from the local disk copy. In cases of dual local failures affecting both cache and disk, the engine 406 coordinates recovery by copying data from the remote array's mirrored copies back to the local array. The engine 406 also manages acknowledgments from remote write operations, only signaling completion to the IO monitor 402 after successful replication.

Through these capabilities, the remote replication engine 406 enables improved cache utilization while maintaining enterprise-grade fault tolerance. Its efficient handling of remote writes contributes to reduced system costs by allowing for smaller cache configurations on the primary array while preserving data protection through the remote copies.

In embodiments, the controller 142 can include a fault manager 408 that implements comprehensive failure detection and recovery mechanisms to maintain data protection across the storage array system. Upon detecting a failure, the fault manager 408 executes specialized recovery procedures based on the type and location of the failure.

For primary mirror failures, the fault manager 408 coordinates data recovery by retrieving data from the temporary disk space where the synchronous cut-through write was performed. This recovery path leverages the backend manager's fast disk writes to quickly restore access to the data.

For site or network failures after host acknowledgment, the fault manager 408 maintains data availability through the local unmirrored cache slot and disk copy. This dual-copy approach on the local array ensures continued access even when the remote array is unavailable.

For dual failures affecting both the local cache and disk, the fault manager 408 orchestrates recovery by coordinating with the remote replication engine 406 to copy data from the remote array's mirrored copies back to the local array. This capability ensures data protection even in severe failure scenarios.

The fault manager 408 continuously monitors system health across multiple components, including memory boards, disk drives, and network connections. It works in conjunction with other controller components to ensure write operations maintain proper redundancy—coordinating with the IO monitor 402 for write acknowledgments, the backend manager 404 for disk operations, and the remote replication engine 406 for remote array communication.

Through these sophisticated failure handling mechanisms, the fault manager 408 enables the storage array to maintain enterprise-grade fault tolerance while supporting optimized cache utilization. Its efficient recovery procedures help minimize system downtime and ensure data protection across various failure scenarios.

In embodiments, the controller 142 can include a memory subsystem 410 that manages cache allocation and utilization to optimize global memory (e.g., DRAM) usage while maintaining data protection. It allocates unmirrored cache slots on the local array instead of traditional mirrored pairs for devices enabled with synchronous remote replication, effectively doubling the available cache space.

The subsystem 410 implements sophisticated slot management, tracking write pending status for cache slots and coordinating their lifecycle from allocation through deallocation. For replication-enabled devices, it maintains a single copy in the unmirrored cache slot while coordinating with the backend manager 404 for synchronous disk writes and the Remote Replication Engine for remote mirrored copies.

The memory subsystem 410 maintains traditional mirrored cache slot behavior for non-replication devices to preserve conventional redundancy mechanisms. This selective optimization allows for reduced DRAM usage only where appropriate while maintaining required fault tolerance levels.

The subsystem 410 coordinates with other controller components to ensure proper data protection. It works with the IO monitor 402 for initial slot allocation, the backend manager 404 for destaging operations, and the fault manager 408 for failure scenarios. After successful destaging operations, it clears write pending flags and manages slot recycling to optimize cache utilization.

The memory subsystem 410 enables significant performance improvements through these capabilities by increasing cache hits and reducing latency through more efficient slot utilization. Its optimized management of cache resources contributes to reduced system costs by allowing for smaller cache configurations while maintaining enterprise-grade data protection.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 5, a method 500 relates to optimizing cache utilization in a storage system with a local and remote array. In embodiments, the controller 142 of FIG. 1 can perform all or a subset of operations corresponding to the method 500.

For example, the method 500, at 502, can include receiving a write input/output (IO) operation at a local array. Additionally, at 504, the method 500 can include storing write data corresponding to the write IO operation in an unmirrored cache slot in the local array. Further, the method 500, at 506, can include initiating, in parallel, a synchronous cut-through write of the write data to a temporary disk space in the local array and a remote write of the write data to one or more mirrored cache slots in a remote array. At 508, the method 500 can also include receiving acknowledgments of completion of the synchronous cut-through write and the remote write. The method 500, at 510, can include sending a write completion acknowledgment to a host associated with the write IO operations after receiving the acknowledgments of completion of the synchronous cut-through write and the remote write.

Further, each operation can include any combination of techniques implemented by the embodiments described herein. Additionally, one or more of the storage array's components 108 can implement one or more of the operations of each method described above.

Figure 6:
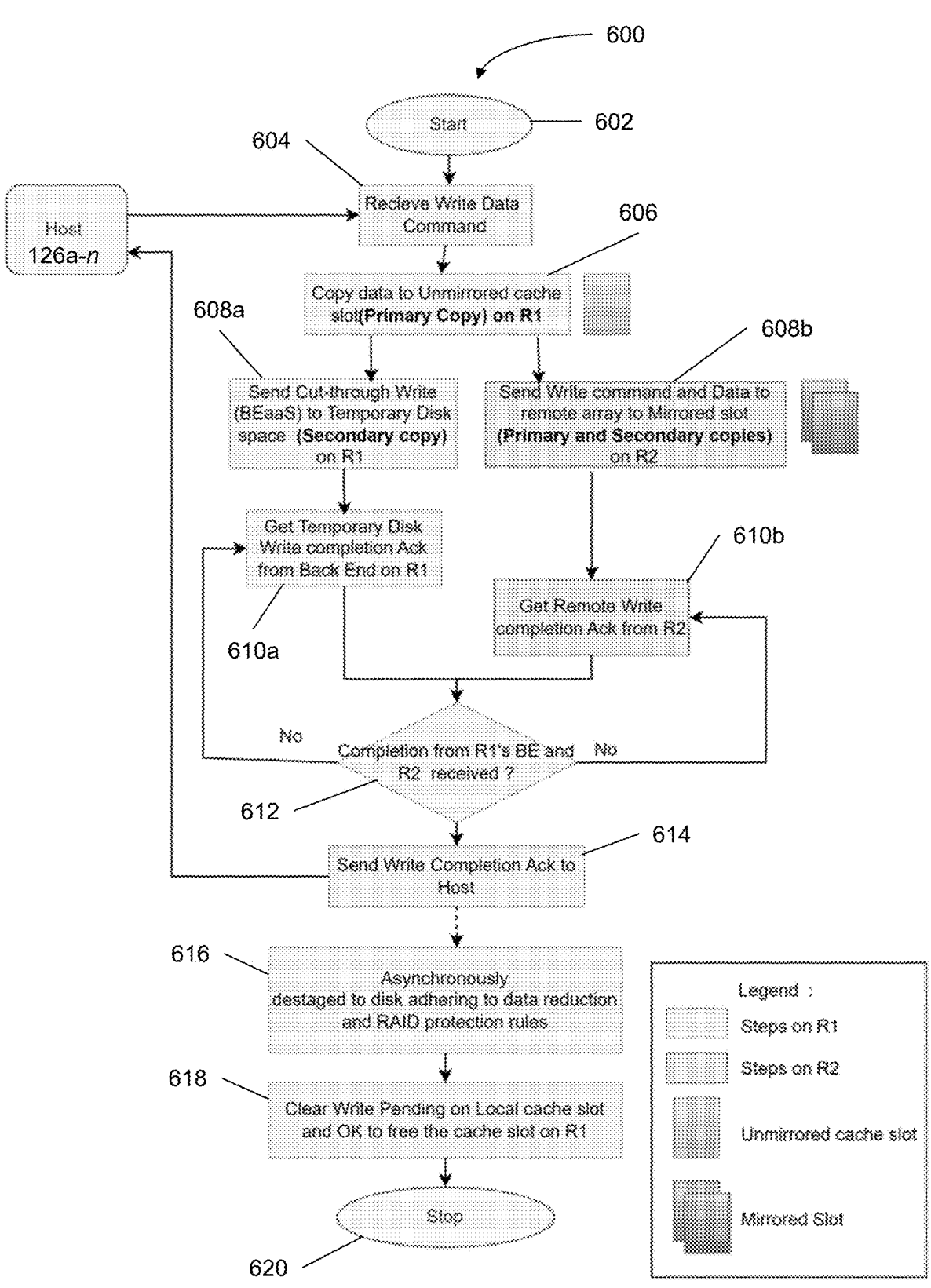
FIG. 6 is a flow diagram of a method for processing input/output (IO) operations requiring remote replication per embodiments of the present disclosure.

Regarding FIG. 6, a method 600 relates to processing input/output (IO) operations requiring remote replication. In embodiments, the controller 142 of FIG. 1 can perform all or a subset of operations corresponding to the method 600.

The method 600, at 602, can start; at 604, the method 600 can include receiving a write IO request. At 606, the method 600 can include storing write data corresponding to the write IO operation in an unmirrored cache slot in a local array R1 (e.g., the storage array 102 of FIG. 1). Further, the method 600 can include initiating, in parallel, a synchronous cut-through write of the write data to a temporary disk space in the local array (608a) and a remote write of the write data to one or more mirrored cache slots in a remote array (608b).

Additionally, the method 600 can, in parallel, include waiting to receive acknowledgments from both operations—an acknowledgment from the backend of R1 confirming completion of the temporary disk write (610a) and an acknowledgment from R2 confirming completion of the remote write to the mirrored cache slots (610b). At 612, the method 600 can include determining whether both acknowledgments are received. If both acknowledgments are not received, the method 600 can continue to wait for the two acknowledgments (610a-b). After both acknowledgments are received, the method 600, at 614, can include sending a write completion acknowledgment back to the host. The method 600, at 616, can also include asynchronously destaging the data corresponding to the write IO request from the unmirrored cache slot to disk storage on R1, following standard data reduction and RAID protection rules. At 618, the method 600 can include clearing a write pending status corresponding to the write IO request for the unmirrored cache slot on R1, marking it as available for reuse.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

receiving a write input/output (IO) operation at a local array;

storing write data corresponding to the write IO operation in an unmirrored cache slot in the local array;

initiating, in parallel:

a synchronous cut-through write of the write data to a temporary disk space in the local array, and a remote write of the write data to one or more mirrored cache slots in a remote array;

receiving acknowledgments of completion of the synchronous cut-through write and the remote write; and sending a write completion acknowledgment to a host associated with the write IO operations after receiving the acknowledgments of completion of the synchronous cut-through write and the remote write.

2. The method of claim 1, further comprising:

determining that the write IO operation targets a device enabled for synchronous remote replication; and selecting the unmirrored cache slot based on the determination.

3. The method of claim 1, further comprising:

asynchronously destaging the write data from the unmirrored cache slot to a disk drive in the local array according to data reduction and RAID protection rules.

4. The method of claim 1, further comprising:

retrieving the write data from the temporary disk space in response to a failure of the unmirrored cache slot in the local array.

5. The method of claim 1, further comprising:

maintaining access to the write data through the unmirrored cache slot and the temporary disk space in the local array in response to a failure of the remote array and a network connecting the local and remote arrays.

6. The method of claim 1, further comprising:

retrieving the write data from the one or more mirrored cache slots in the remote array in response to failures of the unmirrored cache slot and the temporary disk space in the local array.

7. The method of claim 1, further comprising:

executing the synchronous cut-through write by bypassing a backend adapter to write directly to the temporary disk space.

8. The method of claim 1, further comprising:

clearing a write pending status for the unmirrored cache slot after completing an asynchronous destaging; and freeing the unmirrored cache slot for reuse.

9. The method of claim 1, further comprising:

reducing memory usage in the local array by storing the write data in the unmirrored cache slot instead of a mirrored cache slot while maintaining fault tolerance through the temporary disk space and remote array copies.

10. The method of claim 1, further comprising:

completing the synchronous cut-through write in less time than the remote write to avoid adding latency to the write IO operation.

11. An apparatus with a memory and processor, the apparatus configured to:

receive a write input/output (IO) operation at a local array;

store write data corresponding to the write IO operation in an unmirrored cache slot in the local array;

initiate, in parallel:

a synchronous cut-through write of the write data to a temporary disk space in the local array, and a remote write of the write data to one or more mirrored cache slots in a remote array;

receive acknowledgments of completion of the synchronous cut-through write and the remote write; and send a write completion acknowledgment to a host associated with the write IO operations after receiving the acknowledgments of completion of the synchronous cut-through write and the remote write.

12. The apparatus of claim 11, further configured to:

determine that the write IO operation targets a device enabled for synchronous remote replication; and select the unmirrored cache slot based on the determination.

13. The apparatus of claim 11, further configured to:

asynchronously destage the write data from the unmirrored cache slot to a disk drive in the local array according to data reduction and RAID protection rules.

14. The apparatus of claim 11, further configured to:

retrieve the write data from the temporary disk space in response to a failure of the unmirrored cache slot in the local array.

15. The apparatus of claim 11, further configured to:

maintain access to the write data through the unmirrored cache slot and the temporary disk space in the local array in response to a failure of the remote array and a network connecting the local and remote arrays.

16. The apparatus of claim 11, further configured to:

retrieve the write data from the one or more mirrored cache slots in the remote array in response to failures of the unmirrored cache slot and the temporary disk space in the local array.

17. The apparatus of claim 11, further configured to:

execute the synchronous cut-through write by bypassing a backend adapter to write directly to the temporary disk space.

18. The apparatus of claim 11, further configured to:

clear a write pending status for the unmirrored cache slot after completing an asynchronous destaging; and free the unmirrored cache slot for reuse.

19. The apparatus of claim 11, further configured to:

reduce memory usage in the local array by storing the write data in the unmirrored cache slot instead of a mirrored cache slot while maintaining fault tolerance through the temporary disk space and remote array copies.

20. The apparatus of claim 11, further configured to:

complete the synchronous cut-through write in less time than the remote write to avoid adding latency to the write IO operation.

* * * * *